(12) United States Patent
Wong

(10) Patent No.: US 6,641,070 B1
(45) Date of Patent: Nov. 4, 2003

(54) SPINCAST FISHING REEL HAVING MULTIPIECE REAR COVER ASSEMBLY

(75) Inventor: Kwok Y. Wong, Hong Kong (CN)

(73) Assignee: Shakespeare Company, Columbia, SC (US)

( * ) Notice: Subject to any disclaimer, the term of this patent is extended or adjusted under 35 U.S.C. 154(b) by 0 days.

(21) Appl. No.: 09/999,778

(22) Filed: Oct. 25, 2001

(51) Int. Cl.$^7$ .............................................. A01K 89/01
(52) U.S. Cl. ...................................... 242/312; 242/311
(58) Field of Search .............................. 242/310, 312, 242/311, 238, 239, 240

(56) References Cited

U.S. PATENT DOCUMENTS

| | | | |
|---|---|---|---|
| 3,474,984 A | | 10/1969 | Hull |
| 3,602,453 A | * | 8/1971 | Holmes ....................... 242/309 |
| 3,877,658 A | * | 4/1975 | Lemery ....................... 242/236 |
| 4,353,514 A | | 10/1982 | Neufeld |
| 4,359,196 A | | 11/1982 | Puryear |
| 4,408,729 A | * | 10/1983 | Moss et al. .................. 242/244 |
| 4,456,194 A | * | 6/1984 | Noda ......................... 242/240 |
| 4,548,367 A | | 10/1985 | Councilman |
| 4,627,188 A | | 12/1986 | Razote |
| 4,664,330 A | | 5/1987 | Darden |
| 5,137,227 A | | 8/1992 | Allis et al. |
| 5,457,886 A | | 10/1995 | Fuller |
| 5,795,035 A | | 8/1998 | Fuller |
| 5,855,331 A | * | 1/1999 | Morimoto et al. .......... 242/310 |
| 6,070,822 A | | 6/2000 | Zwayer et al. |

* cited by examiner

Primary Examiner—Kathy Matecki
Assistant Examiner—Evan Langdon
(74) Attorney, Agent, or Firm—Nelson Mullins Riley & Scarborough

(57) ABSTRACT

A fishing reel includes a reel frame to which a cover is attached so as to enclose various internal components. The cover defines a configured opening in which an insert piece is received. One or more screws or other suitable fasteners extend between the insert piece and the reel frame to trap the cover into secure engagement with the reel frame. Thus, the cover may be attached without an external attachment mechanism as has often been required in the past.

21 Claims, 4 Drawing Sheets

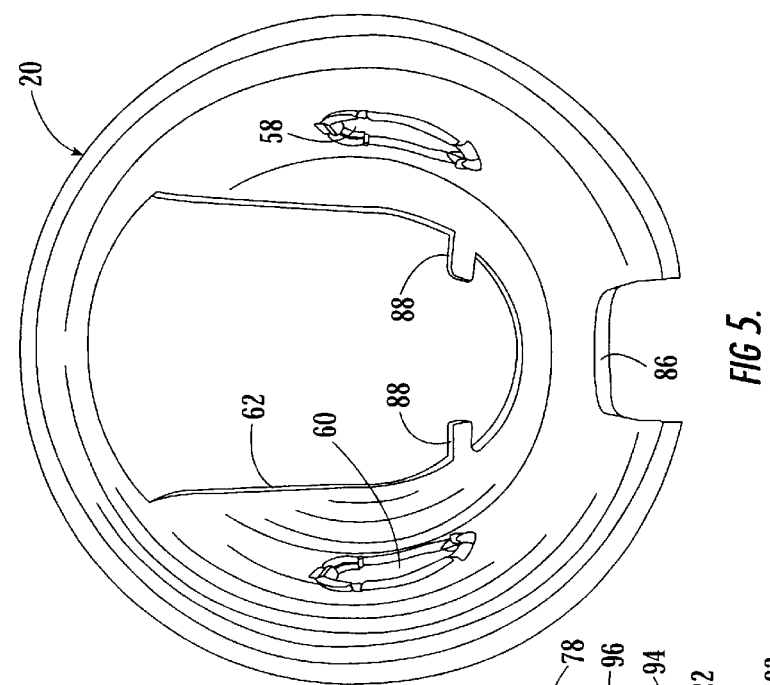
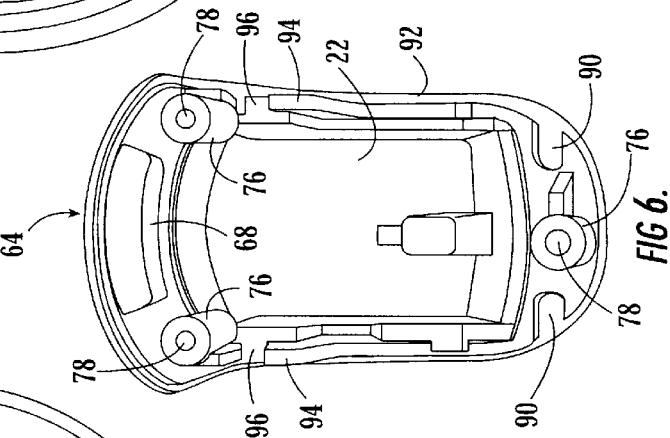
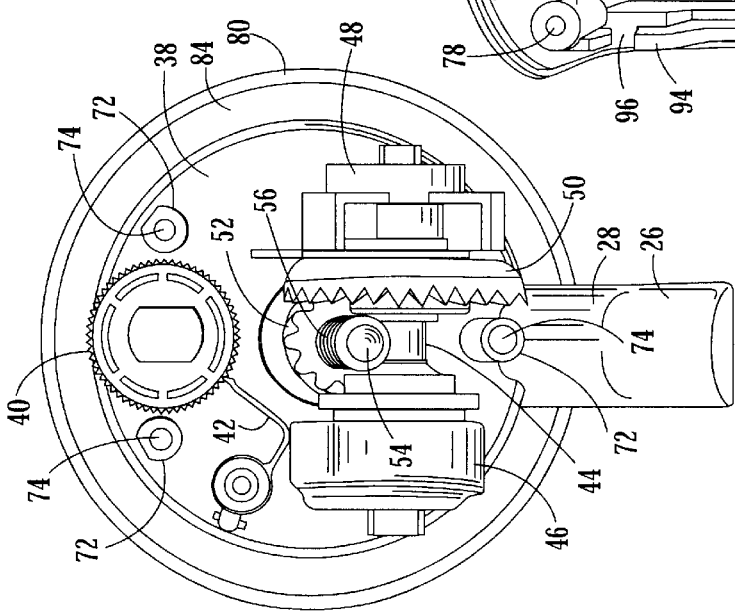

SPINCAST FISHING REEL HAVING MULTIPIECE REAR COVER ASSEMBLY

BACKGROUND OF THE INVENTION

The present invention relates to the art of fishing reels. More particularly, the invention relates to improvements in the manner in which the cover of a fishing reel is connected to the reel frame.

A variety of different types of fishing reels are available in the marketplace. One common type of fishing reel, known as a spincast reel, typically has a central body (or "reel frame") to which front and rear covers are attached. The front cover defines a front compartment in which a line spool and pickup head are located. The pickup head rotates when the reel's crank handle is turned by a user so as to wind fishing line around the spool. The fishing line extends through an opening at the forward end of the front cover.

Various other internal components are located in the rear compartment formed by the rear cover. These components typically include a transverse shaft supporting the crank handle, as well as gears for converting transverse rotation of this shaft into axial rotation of the pickup head. The rear cover often carries a thumb button for allowing the fishing line to be cast. Alternatively, some spincast fishing reels utilize a casting lever instead of a thumb button.

A variety of techniques have been utilized in the past to attach one or more of the covers to the reel frame. For example, the reel frame may include external threads that engage internal threads in the cover. Alternatively, the cover may include tabs that are twisted into corresponding slots located on the reel frame. While these techniques have worked generally well, there is a need in the art for additional effective arrangements.

SUMMARY OF THE INVENTION

The present invention recognizes and addresses the foregoing considerations, and others, of prior art constructions and methods.

According to one aspect, the present invention provides a fishing reel comprising a reel frame and a cover adapted to engage the reel frame so as to enclose internal components of the reel. The cover defines a configured opening in which an insert piece is received. At least one fastener extends between the insert piece and the reel frame so as to trap the cover into secure engagement with the reel frame.

The cover of the fishing reel including the configured opening may often be a rear cover. In such embodiments, the insert piece may include a stationary element carrying a pivotal thumb button. For example, the stationary element may have a generally L-shaped configuration integrally including a back portion and an upper portion. The upper portion of the stationary element may define a slot through which a drag wheel extends in some exemplary embodiments.

Preferably, the fastener may comprise a plurality of screws extending from the reel frame into threading engagement with respective screw holes located in the insert piece. The reel frame may include respective guide bosses through which the screws pass. The guide bosses are preferably located so as to be in axial alignment with respective receiving bosses of the insert piece.

In some exemplary embodiments, the reel frame may define a seating lip engaged by a leading end of the cover. A conical surface may be defined on the reel frame radially inward of the seating lip so as to facilitate seating of the cover. Embodiments are also contemplated in which the cover defines a notch for receipt of a foot stem extending from the reel frame. Moreover, the cover may include at least one retaining tab extending between the configured opening and the insert piece so as to retain and orientate the insert piece with respect to the cover. For example, a pair of retaining tabs may be located on respective opposite sides of the configured opening.

In another aspect, the present invention provides a fishing reel comprising a reel frame and a crank handle. A front cover, defining a first internal compartment of the reel, is also provided. The front cover includes a forward opening therein through which fishing line extends. The fishing reel further includes a rear cover defining a second internal compartment of the reel. The rear cover defines a configured opening therein for receipt of an insert piece. The insert piece includes a stationary element carrying a pivotal thumb button. At least one fastener extends between the insert piece and the reel frame so as to trap the rear cover into engagement with the reel frame.

Still further aspects of the present invention are achieved by a method of attaching a cover to a reel frame of a fishing reel. One step of the method involves providing a plurality of first screw holes at selected locations in a transverse wall of the reel frame. According to another step, an insert piece, having a plurality of second screw holes located to axially align with the first screw holes, is inserted into a configured opening defined in the cover. Another step involves moving the cover into position adjacent the reel frame. According to a still further step, screws are inserted through the first screw holes and into threading engagement with the second screw holes defined in the insert piece. Another step involves tightening the screws so as to trap the cover into secure engagement with the reel frame.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying drawings, in which:

FIG. 4 is a view of the reel's frame as taken along line 4—4 of FIG. 3;

FIG. 5 is a view of the rear cover taken along line 5—5 of FIG. 3; and

FIG. 6 is a view of the insert piece as taken along line 6—6 of FIG. 3.

Figure 1:
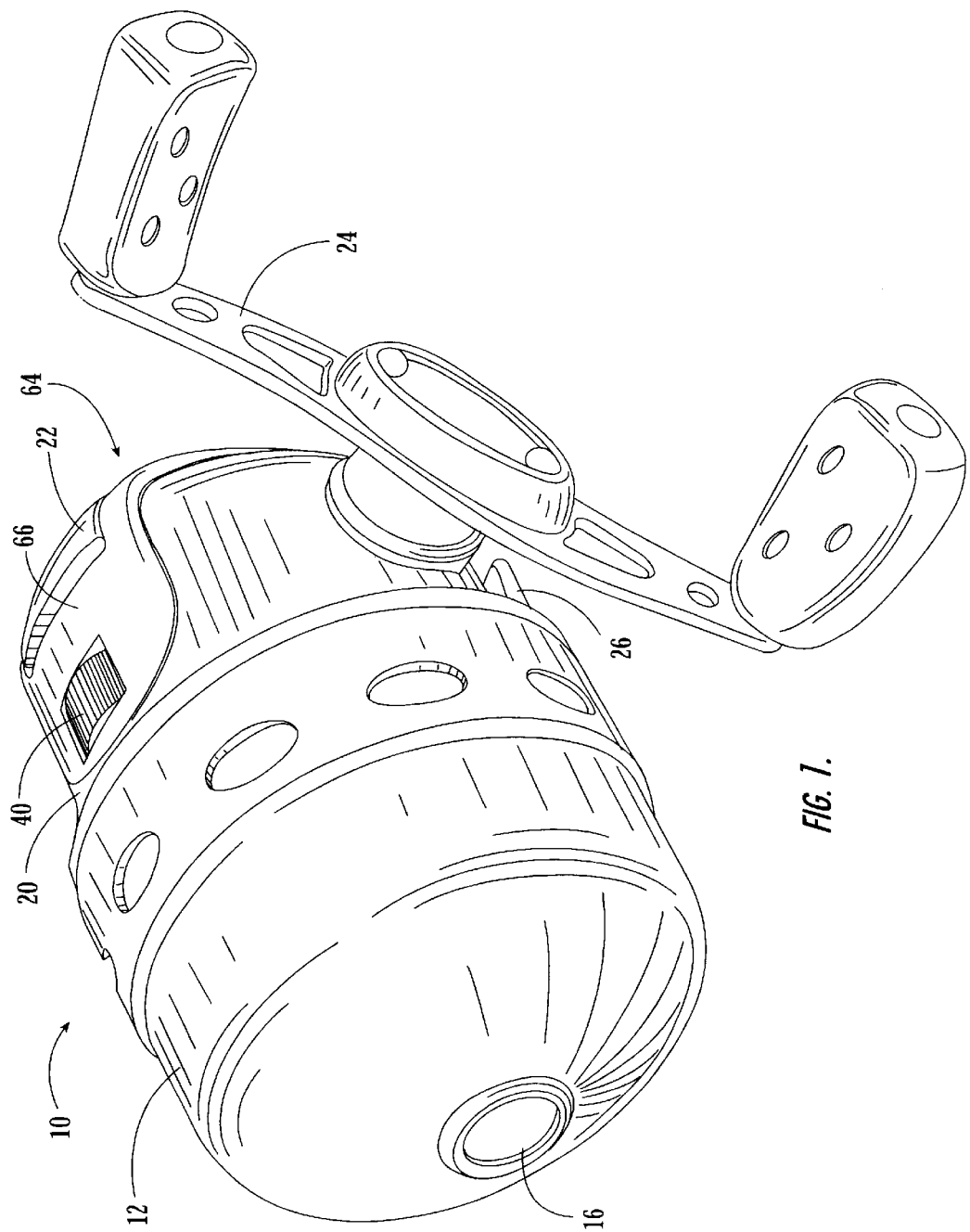
FIG. 1 is a front perspective view of a spincast fishing reel constructed in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention.

Figure 2:
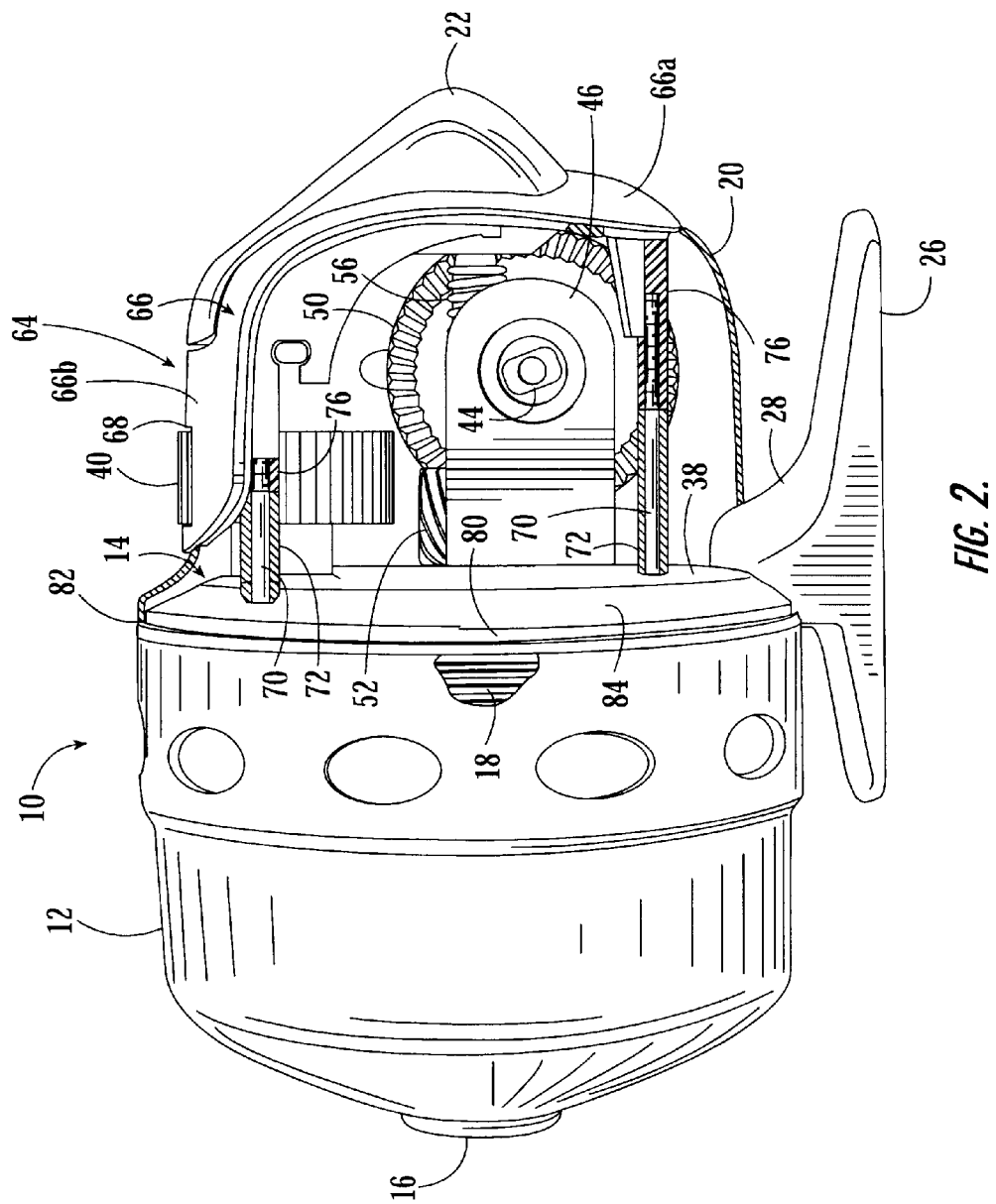
FIG. 2 is a side elevation of the reel shown in FIG. 1 with portions of the rear cover cut away to reveal various internal details.

FIGS. 1 and 2 illustrate an improved spincast reel 10 constructed in accordance with the present invention. Reel 10 includes a front cover 12 detachably connected to a central reel frame 14 (FIG. 2). A forward opening 16 is defined in front cover 12 to allow fishing line to pass therethrough. As shown, front cover 12 may be conventionally connected to reel frame 14 via threads 18 defined about the forward circumference of reel frame 14.

Reel 10 further includes a rear cover 20 detachably connected to reel frame 14. A pivotal thumb button 22, located at the back of reel 10, may be depressed by a user to allow casting of the fishing line in a well-known manner. Embodiments of the present invention are also contemplated that utilize a casting lever or other alternative actuator instead of a pivotal thumb button. A crank handle 24 is rotated by a user when it is desired to wind the fishing line back in. In this case, reel frame 14 includes a mounting foot 26 attached to the distal end of a foot stem 28 to permit reel 10 to be mounted to a fishing rod.

Figure 3:
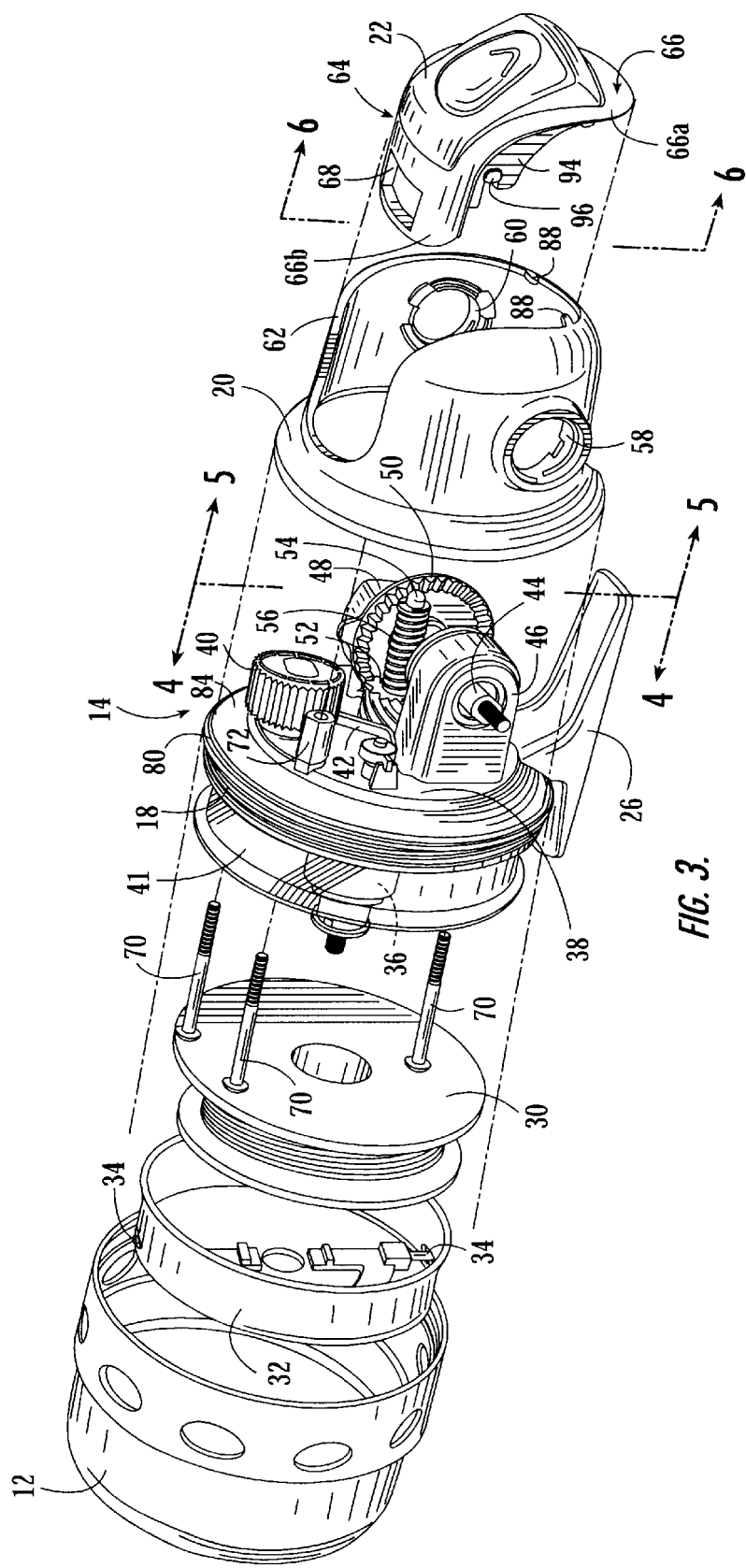
FIG. 3 is an exploded view of the reel shown in FIG. 1.

Front cover 12 and rear cover 20 are shown detached in FIG. 3 to reveal various internal components located within the reel. For example, front cover 12 defines a forward compartment enclosing a line spool 30 and a rotatable pickup head 32. In this case, pickup head 32 is constructed having a pair of diametrically opposed pickup pins 34. During casting of the fishing line, pickup pins 34 are retracted into pickup head 32. Pins 34 extend to engage the fishing line when it is being retrieved. As a result, fishing line will be wound onto line spool 30 when crank handle 24 is turned.

Line spool 30 is mounted on a cylindrical hub 36 integrally extending from a transverse wall 38 of the reel frame. Normally, line spool 30 will not rotate during use, but may undergo limited rotary slippage under line tension. The drag force required to produce such slippage is controlled by the reel's drag mechanism and may be adjusted by a thumb wheel 40. In the illustrated embodiment, a clicker mechanism 42 provides an audible indication that the drag force is being adjusted. An annular shroud 41, made of a transparent plastic material in the illustrated embodiment, may be located on reel frame 14 so as to partially surround line spool 30.

Certain additional details regarding the construction of reel 10 can be described with reference to FIGS. 2 through 4. For example, the rear compartment defined by rear cover 20 contains a transverse shaft 44 supported for rotation at 46 and 48. During use, crank handle 24 will be attached to transverse shaft 44. A bevel gear 50, carried by shaft 44, engages a pinion 52 located on an axial main shaft 54. Because pickup head 32 is connected to main shaft 54, pickup head 54 will be rotated as the user turns crank handle 24.

Main shaft 54 is axially movable with respect to pinion 52, but is normally urged in an axially rearward direction by a helical spring 56. The end of main shaft 54 is pushed forward when thumb button 22 is depressed, thus permitting the fishing line to be cast. Rear cover 20 may define opposed openings 58 and 60 to permit placement of crank handle 24 on either side of the reel. In this manner, reel 10 may be conveniently used by both left-handed and right-handed individuals. When one of openings 58 and 60 is employed for attachment of crank handle 24, the other is preferably covered with a suitable plug or the like in a manner well known in the art.

The manner in which rear cover 20 is connected to reel frame 14 will now be described with reference to FIGS. 2 and 3. As can be seen, rear cover 20 defines a large configured opening 62 (FIG. 3) in which an insert piece 64 is received. Insert piece 64 includes a stationary element 66 to which thumb button 22 is pivotally connected. In the illustrated embodiment, for example, stationary element 66 has a generally L-shaped configuration including a back portion 66a and an upper portion 66b. A slot 68 for drag wheel 40 may be defined in upper portion 66b of stationary element 66.

Rear cover 20 is secured in position utilizing at least one suitable fastener extending between insert piece 64 and reel frame 14. In this case, for example, three screws 70 are provided for this purpose, although a greater or lesser number of fasteners may be appropriate in various embodiments of the invention. Screws 70 extend through transverse wall 38 of reel frame 14 into threading engagement with corresponding screw holes located in insert piece 64. When screws 70 are tightened, rear cover 20 will be trapped into secure engagement with reel frame 14.

Referring now also to FIG. 4, a plurality of guide bosses 72 preferably extend from transverse wall 38 of reel frame 14. Guide bosses 72 each define a respective through-bore 74 to align screws 70 with the corresponding screw holes of insert piece 64. As shown in FIG. 6, insert piece 64 preferably includes a plurality of receiving bosses 76 in which the respective screw holes 78 are defined. Preferably, the axial length of guide bosses 72 and receiving bosses 76 will be such that they will abut one another when screws 70 are tightened.

Referring particularly to FIG. 2, reel frame 14 may define a seating lip 80 about its rear circumference. As shown, seating lip 80 is engaged (as indicated at 82) by a leading end of rear cover 20. While rear cover 20 is shown directly engaging seating lip 80 in this case, it is contemplated that reel frame 14 may also be engaged by rear cover 20 through interposing gaskets and the like. Moreover, reel frame 14 may define a configured surface, such as conical surface 84, radially inward of seating lip 80 to facilitate seating of rear cover 20 in the correct position.

Various additional features will now be described with reference to FIGS. 5 and 6. As shown in FIG. 5, rear cover 20 defines a notch 86 in the illustrated embodiment for receipt of foot stem 28. Preferably, at least one retaining tab may be provided extending between configured opening 62 and insert piece 64 so as to retain and orientate insert piece 64 with respect to rear cover 20. In this embodiment, for example, a pair of opposed retaining tabs 88 are located at configured opening 62. As shown in FIG. 6, insert piece 64 may define configured recesses 90 for receipt of respective retaining tabs 88. A lip 92 may also be defined about the perimeter of insert piece 64 to facilitate seating of insert piece 64 in configured opening 62.

To attach rear cover 20 to reel frame 14, screws 70 are inserted into through-bores 74 of guide bosses 72. Insert piece 64 is loosely located in configured opening 62, and the two are brought into position proximate to reel frame 14. Screws 70 are inserted into screw holes 78 of receiving bosses 76, and then tightened so as trap rear cover 20 into secure engagement with reel frame 14. As described above, conical surface 84 of reel frame 14 may assist seating the leading end of rear cover 20 against seating lip 80. Preferably, thumb wheel 40 is allowed to move axially on its supporting shaft to facilitate insertion into slot 68 of insert piece 64. During use, however, the configuration of slot 68 prevents undesirable axial movement of thumb wheel 40.

It will be appreciated that the present invention provides various advantages over many prior art arrangements. For example, it has often been required in the past to manufacture the rear cover of the reel to have an attachment mechanism and thumb button support features. In the illustrated embodiment, these features may be more easily formed as an integral part of insert piece 64. As shown in FIG. 6, for example, insert piece 64 includes pivot supports 94, which receive pivot tabs 96 of thumb button 22.

Because the rear cover is relieved of having attachment mechanism and thumb button support features, its manufacture can be simplified. For example, rear cover 20 may be inexpensively made of stamped aluminum, molded plastic or other suitable material. Insert piece 64 is preferably constructed of plastic, although other suitable materials such as die cast zinc or aluminum may also be desirable in some embodiments. In addition, the absence of an attachment mechanism visible from the exterior of the reel enhances the reel's aesthetic appeal.

While preferred embodiments of the invention have been shown and described, modifications and variations may be made thereto by those skilled in the art without departing from the spirit and scope of the present invention. For example, while the present invention has been described above with reference to a spincast reel, it should be appreciated that principles of the invention are also applicable to other types of reels. In addition, it may be desirable in some cases to attach the front cover in a manner similar to the manner in which the rear cover is attached in the embodiment illustrated in the drawings.

Thus, it should be understood that aspects of various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A fishing reel comprising:
    a reel frame having a transverse wall;
    a cover adapted to engage said reel frame so as enclose internal components of said reel, said cover defining a configured opening therein;
    an insert piece received in said configured opening of said cover; and
    at least one fastener extending between said insert piece and said transverse wall of said reel frame so as to trap said cover into secure engagement with said reel frame.

2. A fishing reel as set forth in claim 1, wherein said cover is a rear cover of said fishing reel.

3. A fishing reel comprising:
    a reel frame;
    a cover adapted to engage said reel frame so as enclose internal components of said reel, said cover defining a configured opening therein;
    an insert piece received in said configured opening of said cover, wherein said insert piece includes a stationary element carrying a pivotal thumb button;
    at least one fastener extending between said insert piece and said reel frame so as to trap said cover into secure engagement with said reel frame; and
    wherein said cover is a rear cover of said fishing reel.

4. A fishing reel as set forth in claim 3, wherein said stationary element has a generally L-shaped configuration integrally including a back portion and an upper portion.

5. A fishing reel as set forth in claim 4, wherein said upper portion of said stationary element defines a slot through which a drag wheel extends.

6. A fishing reel as set forth in claim 1, wherein said at least one fastener comprises a plurality of screws.

7. A fishing reel as set forth in claim 6, wherein said plurality of screws extend from said reel frame into threading engagement with respective screw holes located in said insert piece.

8. A fishing reel comprising:
    a reel frame;
    a cover adapted to engage said reel frame so as enclose internal components of said reel, said cover defining a configured opening therein;
    an insert piece received in said configured opening of said cover; and
    a plurality of screws extending from said reel frame into threading engagement with respective screw holes located in said insert piece so as to trap said cover into secure engagement with said reel frame, wherein said screw holes of said insert piece are defined in respective receiving bosses.

9. A fishing reel as set forth in claim 8, wherein said reel frame includes respective guide bosses through which said screws pass, said guide bosses being in axial alignment with said receiving bosses.

10. A fishing reel comprising:
    a reel frame;
    a cover adapted to engage said reel frame so as enclose internal components of said reel, said cover defining a configured opening therein;
    an insert piece received in said configured opening of said cover;
    at least one fastener extending between said insert piece and said reel frame so as to trap said cover into secure engagement with said reel frame; and
    wherein said reel frame defines a seating lip engaged by a leading end of said cover.

11. A fishing reel as set forth in claim 10, wherein said reel frame defines a conical surface radially inward of said seating lip that facilitates seating of said cover.

12. A fishing reel as set forth in claim 10, wherein said reel frame includes a mounting foot attached to a distal end of a foot stem, said cover defining a notch for receipt of said foot stem.

13. A fishing reel as set forth in claim 10, wherein said cover includes at least one retaining tab extending between said configured opening and said insert piece so as to retain and orientate said insert piece with respect to said cover.

14. A fishing reel as set forth in claim 13, wherein said at least one retaining tab includes a pair of retaining tabs located on respective opposite sides of said configured opening.

15. A fishing reel comprising:
    a reel frame;
    a crank handle;
    a front cover defining a first internal compartment of said reel, said front cover including a forward opening therein through which fishing line extends;
    a rear cover defining a second internal compartment of said reel, said rear cover defining a configured opening therein;
    an insert piece received in said configured opening of said rear cover, said insert piece including a stationary element carrying a pivotal thumb button; and
    at least one fastener extending between said insert piece and said reel frame so as to trap said rear cover into engagement with said reel frame.

16. A fishing reel as set forth in claim 15, wherein said stationary element has a generally L-shaped configuration including a back portion and an upper portion, said upper portion of said stationary element including defines a slot through which a drag wheel extends.

17. A fishing reel as set forth in claim 15, wherein said at least one fastener comprises a plurality of screws extending from said reel frame into threading engagement with respective screw holes located in said insert piece.

18. A fishing reel as set forth in claim 15, wherein said reel frame defines seating lip engaged by a leading end of said rear cover.

19. A fishing reel as set forth in claim 18, wherein said reel frame defines a conical surface radially inward of said seating lip that facilitates seating of said cover.

20. A fishing reel as set forth in claim 15, wherein said rear cover comprises a pair of retaining tabs located on respective opposite sides of said configured opening of said rear cover, said retaining tabs being received in corresponding recesses in said insert piece so as to retain and orientate said insert piece with respect to said rear cover.

21. A method of attaching a cover to a reel frame of a fishing reel, said method comprising steps of:

providing a plurality of first screw holes at selected locations in a transverse wall of said reel frame;

inserting an insert piece into a configured opening defined in said cover, said insert piece having a plurality of second screw holes located to axially align with said first screw holes;

moving said cover into position adjacent said reel frame;

inserting screws through said first screw holes and into threading engagement with said second screw holes defined in said insert piece; and tightening said screws so as to trap said cover into secure engagement with said reel frame.

* * * * *